United States Patent [19]
Boyer et al.

[11] 4,255,841
[45] Mar. 17, 1981

[54] CONDENSER CONSTRUCTION WITH DELAYED TUBE BUNDLES

[75] Inventors: Robert C. Boyer, Catasauqua; George J. Williams, Chalfont, both of Pa.

[73] Assignee: Ecolaire Incorporated, Malvern, Pa.

[21] Appl. No.: 68,022

[22] Filed: Aug. 20, 1979

[51] Int. Cl.³ .................. B23P 15/26; B01J 8/06; B21D 53/06
[52] U.S. Cl. ................... 29/157.4; 165/110; 29/469
[58] Field of Search .............. 29/157.4, 469; 165/110

[56] References Cited
U.S. PATENT DOCUMENTS

| 3,644,976 | 2/1972 | Roberts, Jr. | 29/469 |
| 4,102,652 | 7/1978 | Vogl | 29/469 |

Primary Examiner—Lowell A. Larson
Assistant Examiner—V. K. Rising
Attorney, Agent, or Firm—Seidel, Gonda, Goldhammer & Panitch

[57] ABSTRACT

A condenser shell for a large steam condenser is installed at a building site of a power plant without any tube bundles. One or more years later, the tube bundles are designed, constructed and installed in the shell.

6 Claims, 5 Drawing Figures

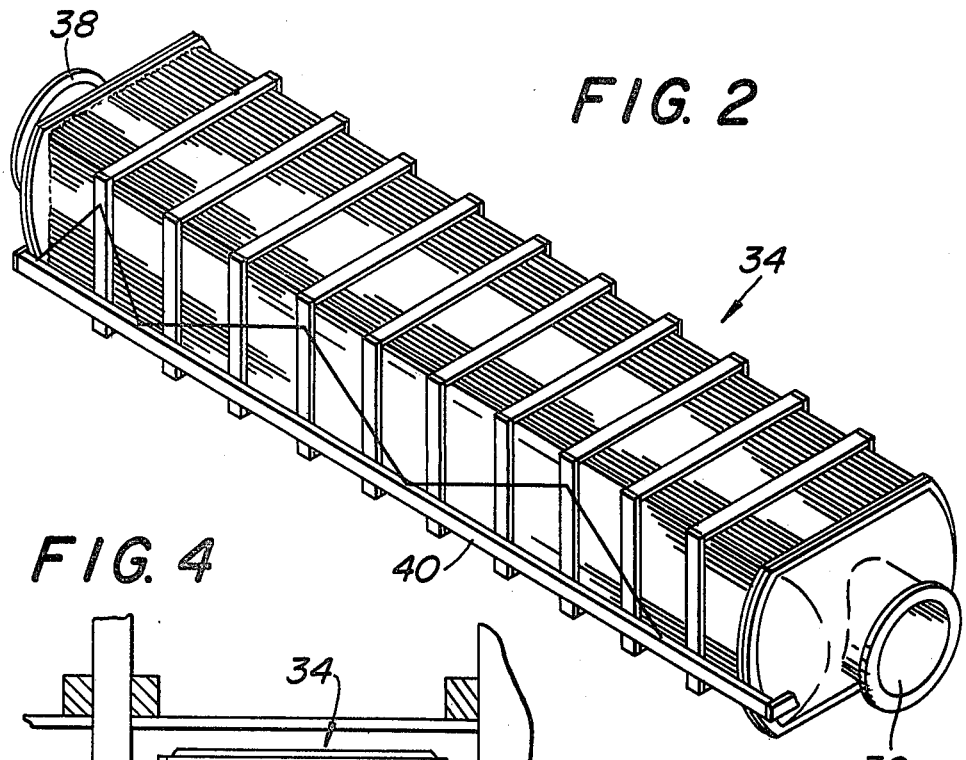
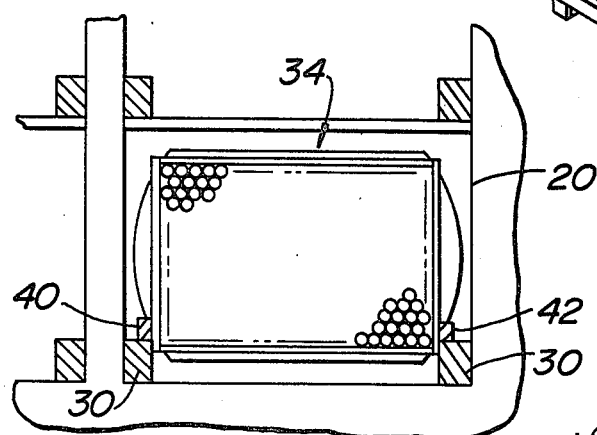
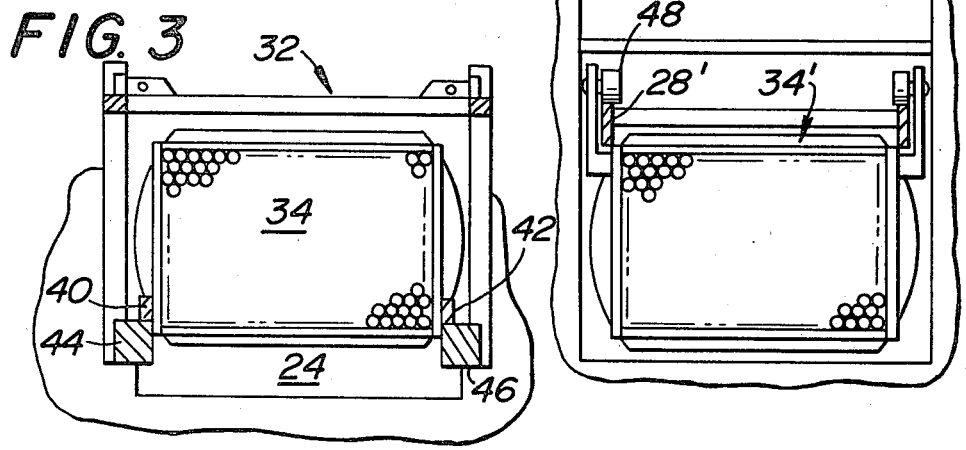

ns841

CONDENSER CONSTRUCTION WITH DELAYED TUBE BUNDLES

BACKGROUND

The conventional steam condenser for a power plant is selected and procured as a unit four to seven years prior to contemplated commercial operation of a power plant. The purchaser is committed to the tube bundles at the time of the purchasing of the condenser. In the construction of a power plant, the steam condensor is one of the first items to be installed. Large condensers are constructed with their shells in various components which are assembled together at the site. Tube bundles are subject to damage during a period of field storage and/or during the assembly of the condenser since a considerable amount of work must be done around and above the tube bundles.

The present invention recognizes a variety of disadvantages associated with the conventional system as described above and sets forth an entirely different sequence of steps which produces advantages to the owner of the power plant.

SUMMARY OF THE INVENTION

The present invention is directed to a method of manufacturing and assembling a steam condenser which includes constructing a condenser outer shell with an internal track for supporting each tube bundle intended to be installed therein. The condenser shell is installed at a building site of a power plant and connected to interface equipment. One end of the shell is temporarily closed. Additional portions of the power plant including at least one floor of the building above the elevation of the shell is erected while providing an accessway on the same floor as the shell from outside the building.

Thereafter, and shortly before it is desired to use the condenser, the following steps are performed. Each tube bundle is constructed and shipped to the building site. Each tube bundle is moved through the accessway. Any temporary closure on the shell is removed. Each tube bundle is introduced along a track into the shell. The shell is sealed and hydraulic connections to each tube bundle are attained. Thus, the construction and installation of each tube bundle is delayed and occurs long subsequent to construction and installation of the shell.

It is an object of the present invention to provide a novel method in connection with the manufacturing and assembling of a large steam condenser whereby there is a deliberate delay involved in connection with the construction and installation of the tube bundle so as to occur long subsequent to construction and installation of the condenser shell.

Other objects and advantages of the present invention will appear hereinafter.

For the purpose of illustrating the invention, there is shown in the drawings a form which is presently preferred; it being understood, however, that this invention is not limited to the precise arrangements and instrumentalities shown.

FIG. 2 is a perspective view of a tube bundle.

FIG. 3 is a sectional view taken along the line 3—3 in FIG. 1.

FIG. 4 is a sectional view taken along the line 4—4 in FIG. 1.

FIG. 5 is a sectional view similar to FIG. 4 but showing an alternative construction.

Figure 1:
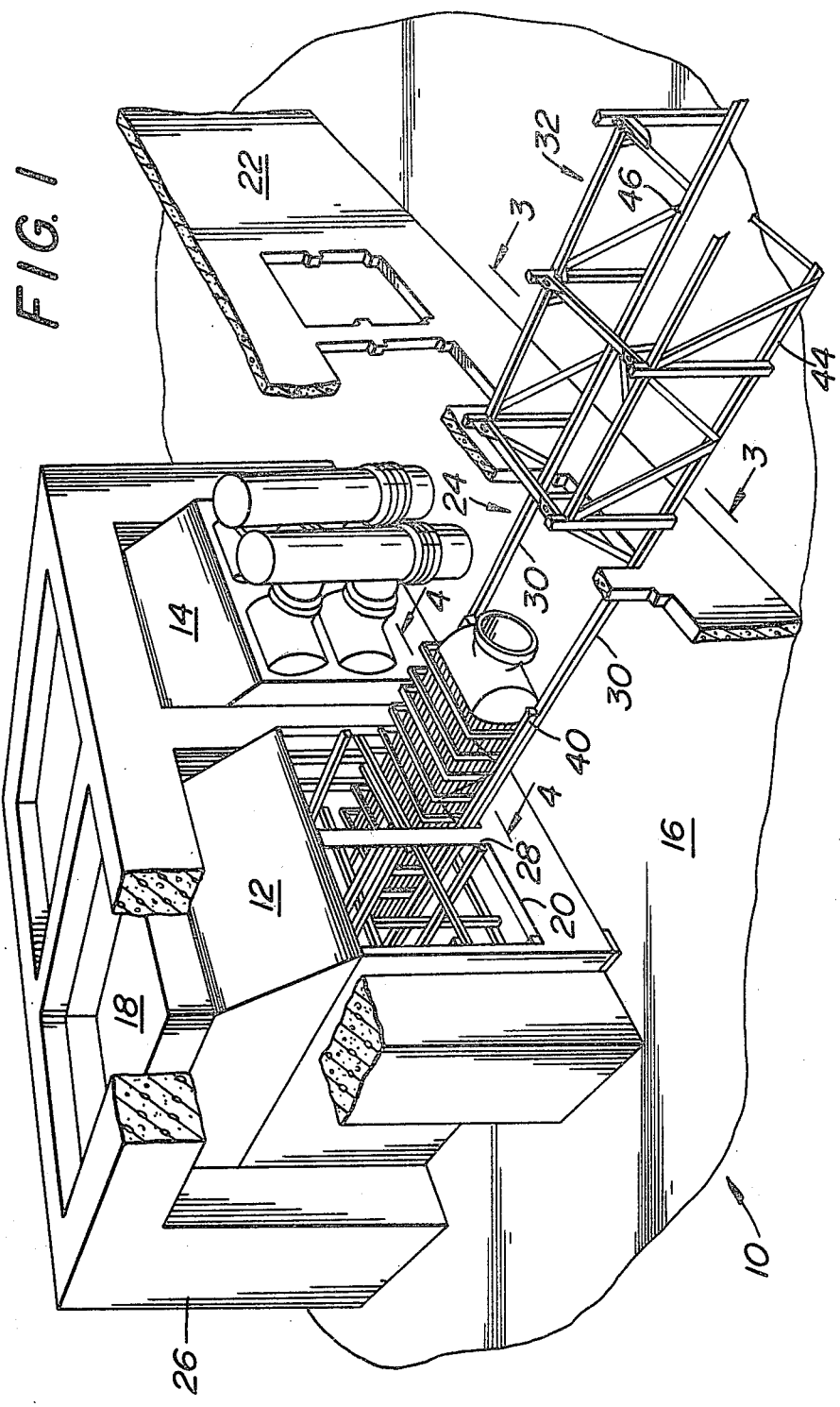
FIG. 1 is a partial perspective view of a power plant being constructed and incorporating the features of the present invention.

Referring to the drawings in detail, wherein like numerals indicate like elements, there is shown in FIG. 1 a building site of an electrical power plant designated generally as 10. The desired number of shells for the condensers are installed at the ground floor 16. For purposes of illustration, two such shells are illustrated and identified as 12 and 14. Each condenser shell has an inlet 18 at its upper end which is temporarily closed. Each of the condenser shells has an opening 20 at one end which is temporarily closed by a removable panel until the tube bundles are being inserted therein as illustrated in FIG. 1.

The power plant includes a wall 22 having an accessway 24 to facilitate installing of the tube bundles long after the power plant 26 has been constructed. The height of the power plant 26 is substantially greater than that illustrated and it will be appreciated that no attempt has been made to illustrate the entire power plant 26. Suffice it to say that several stores of construction exist above the elevation of the condenser shells 12 and 14.

The shells 12 and 14 are designed to accommodate a plurality of tube bundles. As illustrated in FIG. 1, the shells accommodate four tube bundles. The shells are provided with sets of rails 28 to facilitate supporting the tube bundles within the shells. Bridge rails 30 may be provided in the accessway 24 to facilitate temporarily supporting the tube bundles. The rails 30 are easily movable so as to be aligned with each of the sets of rails 28 within the shells.

The tube bundle designated generally as 34 is provided with an inlet 36 at one end and an outlet 38 at the other end. The tube bundle is constructed in a manner so as to have longitudinally extending runners 40 and 42. The tube bundle 34 is moved off a railroad car and to the accessway 24 by way of a lifting apparatus 32. The lifting apparatus 32 has longitudinally extending beams 44 and 46 which are adapted to be aligned with the bridge rails 30. The beams 44 and 46 support the tube bundle 34 by contact with the longitudinally extending runners 40, 42. See FIG. 3.

In FIG. 5, there is illustrated an alternative embodiment wherein the tube bundle 34' is provided with roller 48 which are in rolling contact with the upper surface of rails 28'. The use of rollers facilitates the ease with which the tube bundle may be inserted through the opening 20' into the shell.

The sequence of events when practicing the present invention is as follows. Soon after commencing with construction of a power plant, the condenser shells 12 and 14 are constructed and installed at the ground floor 16. The inlet 18 and the openings 20 are temporarily closed so as to prevent foreign matter from being inadvertently introduced into the shells. The shells are connected to any interface equipment including piping, electrical circuitry, drain connections, etc. When constructing the power plant, provision is made for the accessway 24 to facilitate installing the tube bundle 34 one or more years later. The accessway may include a large opening in the wall 22 which may be subsequently closed or may be utilized as a doorway, window, etc.

Shortly before it is desired to use the steam condensers, the tube bundles 34 are designed, or previous designs are checked to see if any modifications are desired. Thereafter, the tube bundles 34 are manufactured and are shipped to the site 10 by railroad cars or the like. The tube bundles 34 are transported to the accessway 24 by way of the lifting apparatus 32 which may be suspended from above by way of a crane.

The beams 44 and 46 support the tube bundle 34. The beams44 and 46 are aligned with the bridge rails 30. Thereafter, the tube bundle 34 is moved longitudinally off the apparatus 32, onto the bridge rails 30, and then onto the rails 28 within the shell 12 using a winch and cable or equivalent device. Rails 30 may be greased or otherwise rendered slippery to reduce friction. Thereafter, the bridge rails 30 are moved to the next opening to facilitate introduction of additional tube bundles 34 into the condenser 12. Thereafter, the shells 12 and 14 are sealed and hydraulic onnnections are made to each of the tube bundles as shown in connection with the shell 14.

The use of the delayed tube bundle concept disclosed herein can improve the overall time requirements for plant construction since the construction of the condenser shell and the pouring of concrete around the condensers can progress at a faster rate. Any problems in cost involved in connection with the field storage of tubed shell sections is eliminated. The final clean-up of the condenser shell interior can be done with ease prior to the installation of the tube bundles.

Any design mofications desired in connection with the circulating water system through the condensers can be accommodated during the delay period and shortly before commencing with construction of the tube bundles and/or installation of the same.

From the time a power plant is originally designed and up to the time it is licensed for operation, many changes in environmental regulations may occur. Since the tube bundles 34 are the only condenser parts which interact with the environment through the cooling water, any necessary changes as a result of the regulatory changes can be accommodated. This is a distinct advantage particularly in connection with the proliferation of regulatory changes as well as the changes desired as a result of the operation of a protoatype installation, the operation of which generally parallels the design stage of the power plant.

Since the tube bundles 34 are conventionally purchased early in the plant buying cycle, the present invention allows a purchase to be made three to six years later. This is a financial benefit equal to the "time value of money" on the value of the tubing less the material and labor escalation on the tube bundles 34 which may be realized. Additional time is made available in the buying cycle for the purchase of tubing in the tube bundles 34 whereby the lowest possible price may be obtained. In this regard, the buying agent for a power plant generally buys the tubing independent of the purchase of the condenser and has them delivered to the condenser manufacturer for installation. Technological advances in connection with tubing materials may be made during the delay period provided by this invention whereby such advances in tubing materials may be incorporated into the tube bundles 34 without delaying the construction of the power plant 26. For example, at the present time, there is a desire for the use of titanium as the material for the condenser tubing. The high cost of this tubing is due at least in part to the fact there is only a single domestic supplier. Implementation of the present invention may result in the possiblility of a price decrease in the future due to an increase in the number of suppliers.

The present invention facilitates the rapid removal of tube bundles in the event that it becomes necessary to retube the same as part of normal maintenance or as a result of changes in the overall concepts of operation of the condenser at some time in the future. Thus, the pesent invention produces a significant number of advantages over the conventional concepts whereby the tube bundles are designed, manufactured, and installed in the condenser shells years after the shells are installed and just before the condenser is ready to operate as part of a power plant.

The present invention may be embodied in other specific forms without departing from the spirit or essential attributes thereof and, accordingly, reference should be made to the appended claims, rather than to the foregoing specification, as indicating the scope of the invention.

We claim:

1. A method of manufacturing and assembling a steam condenser forming a part of a power plant comprising constructing a condenser outer shell with an internal track for supporting each tube bundle intended to be installed therein, installing the condenser shell at a building site, connecting said shell to interface equipment, temporarily closing at least one end of said shell, erecting additional portions of the building including at least one floor of said building above the elevation of said shell, providing an accessway on the same floor as the shell from outside the building, thereafter and shortly before it is desired to use the condenser the following steps are performed, constructing each tube bundle to be installed in the shell, then shipping each tube bundle to said site, moving each tube bundle through said accessway, removing any temporary closure on said one end of the shell, introducing each tube bundle along a track into said shell, sealing the shell, connecting hydraulic connections to each tube bundle, whereby the construction and installation of each tube bundle is delayed and occurs long subsequent to construction and installation of said shell.

2. A method in accordance with claim 1 wherein the step of moving each tube through the accessway includes supporting the tube bundle by way of a movable set of rails aligned with the track in said shell.

3. A method in accordance with claim 2 wherein said step of shipping each tube bundle to the side includes supporting the tube bundle by longitudinally extending beams on a lifting apparatus, and aligning said beams with said rails to facilitate transfer of the tube bundle off the lifting apparatus and onto said rails for subsequent transfer onto the track within said shell.

4. A method in accordance with claim 1 wherein said step of introducing each tube bundle along a track into said shell includes using rollers on the tube bundle in contact with said track in the shell.

5. A method in accordance with claim 1 wherein the delay in the construction of the tube bundle is between one and four years subsequent to the construction of the condenser outer shell.

6. A method of manufacturing and assemblying a large steam condenser comprising a portion of an electrical power plant, constructing a condenser outer shell with an internal track for supporting at least one tube bundle, installing the condenser shell without a tube bundle therewithin at a building site, temporarily closing at least one end of said shell through which a tube bundle may be introduced into the shell, erecting additional portions of the building including at least one floor of the building above the elevation of the shell while providing an accessway on the same floor as the shell from outside the building, delaying the construction of the tube bundle for at least one year subsequent to the installaton of said shell, thereafter constructing each tube bundle to be installed in the shell, shipping each tube bundle to said site, removing the temporary closure at said o ne end of the shell, introducing each tube bundle through said accessway and into said shell by way of said one end of the shell, sealing said one end of the shell, and connecting hydraulic connections to each tube bundle.

* * * * *